United States Patent
D'Agostino et al.

(10) Patent No.: US 11,605,070 B2
(45) Date of Patent: Mar. 14, 2023

(54) CLOUD-BASED ELECTRONIC PAYMENT PROCESSING

(71) Applicant: THE TORONTO-DOMINION BANK, Mississauga (CA)

(72) Inventors: Dino D'Agostino, Richmond Hill (CA); Paul Mon-Wah Chan, Markham (CA)

(73) Assignee: The Toronto-Dominion Bank, Toronto (CA)

(*) Notice: Subject to any disclaimer, the term of this patent is extended or adjusted under 35 U.S.C. 154(b) by 1124 days.

(21) Appl. No.: 14/446,227

(22) Filed: Jul. 29, 2014

(65) Prior Publication Data

US 2015/0032634 A1    Jan. 29, 2015

Related U.S. Application Data

(60) Provisional application No. 61/859,418, filed on Jul. 29, 2013.

(51) Int. Cl.
*G06Q 20/38* (2012.01)
*G06Q 20/32* (2012.01)
(Continued)

(52) U.S. Cl.
CPC ....... *G06Q 20/3829* (2013.01); *G06Q 20/322* (2013.01); *H04L 9/3215* (2013.01);
(Continued)

(58) Field of Classification Search
CPC ........... G06Q 20/322; G06Q 20/38215; G06Q 20/3829; G06Q 2220/00; H04L 9/3215;
(Continued)

(56) References Cited

U.S. PATENT DOCUMENTS

| | | | |
|---|---|---|---|
| 5,883,810 | A | 3/1999 | Franklin et al. |
| 5,978,840 | A | 11/1999 | Nguyen et al. |

(Continued)

FOREIGN PATENT DOCUMENTS

| | | |
|---|---|---|
| CA | 2673030 A1 | 4/2010 |
| WO | 2013151797 A1 | 10/2013 |
| WO | 2014049136 A1 | 4/2014 |

OTHER PUBLICATIONS

Nidhi Gupta, E-Payment: Issues and Challenges, Jul.-Aug. 2011, vol. 2, No. 4, pp. 1-3. (Year: 2011).*

(Continued)

*Primary Examiner* — Mohammad A. Nilforoush
*Assistant Examiner* — Wodajo Getachew
(74) *Attorney, Agent, or Firm* — Duane Morris LLP

(57) ABSTRACT

A payment processing server generates an asymmetric cryptographic key pair, over one secure communications channel providing a mobile device with one cryptographic key of the cryptographic key pair, and saves another cryptographic key of the cryptographic key pair in a pending transaction database in unique association with a single-use payment number and a financial account. The server encrypts the payment number, which does not identify the financial account, with the another cryptographic key and provides the mobile device with the encrypted payment number over another secure communications channel distinct from the one secure communications channel. The server receives from a payment terminal a payment completion request that includes the encrypted payment number decrypted with the one cryptographic key. The payment processing server queries the pending transaction database with the decrypted payment number to identify the associated financial account, and effects completion of the transaction using the identified financial account.

9 Claims, 4 Drawing Sheets

(51) Int. Cl.
  *H04L 9/40* (2022.01)
  *H04W 12/069* (2021.01)
  *H04L 9/32* (2006.01)
  *H04W 12/06* (2021.01)
  *H04L 67/10* (2022.01)

(52) U.S. Cl.
  CPC .......... *H04L 9/3228* (2013.01); *H04L 9/3263* (2013.01); *H04L 63/18* (2013.01); *H04W 12/068* (2021.01); *H04W 12/069* (2021.01); *G06Q 20/38215* (2013.01); *G06Q 2220/00* (2013.01); *H04L 9/3297* (2013.01); *H04L 63/0846* (2013.01); *H04L 67/10* (2013.01); *H04L 2209/56* (2013.01); *H04L 2209/80* (2013.01); *H04L 2463/062* (2013.01); *H04L 2463/102* (2013.01)

(58) Field of Classification Search
  CPC ... H04L 9/3228; H04L 9/3263; H04L 9/3297; H04L 63/0846; H04L 63/0838; H04L 63/18; H04L 67/10; H04L 2209/56; H04L 2209/80; H04L 2463/062; H04L 2463/102; H04W 12/068; H04W 12/069
  USPC .......................................................... 705/71
  See application file for complete search history.

(56) References Cited

U.S. PATENT DOCUMENTS

| | | | |
|---|---|---|---|
| 6,748,528 B1* | 6/2004 | Greenfield | H04L 63/166 713/168 |
| 6,941,285 B2 | 9/2005 | Sarcanin | |
| 7,107,246 B2 | 9/2006 | Wang | |
| 7,225,249 B1* | 5/2007 | Barry | G06F 16/958 709/227 |
| 7,337,229 B2 | 2/2008 | Dutta et al. | |
| 7,362,869 B2 | 4/2008 | Landrock | |
| 7,428,637 B1 | 9/2008 | Billman et al. | |
| 7,543,146 B1* | 6/2009 | Karandikar | H04L 63/0823 713/175 |
| 7,577,616 B2 | 8/2009 | Zhu | |
| 8,386,773 B2 | 2/2013 | Sherkin et al. | |
| 8,397,988 B1 | 3/2013 | Zuili | |
| 8,458,774 B2 | 6/2013 | Ganesan | |
| 8,522,039 B2 | 8/2013 | Hyndman et al. | |
| 8,565,723 B2 | 10/2013 | Cox | |
| 8,577,766 B2 | 11/2013 | Saban | |
| 8,577,803 B2 | 11/2013 | Chatterjee et al. | |
| 8,584,225 B1 | 11/2013 | Kennedy et al. | |
| 8,601,268 B2 | 12/2013 | Judell | |
| 8,620,790 B2 | 12/2013 | Priebatsch | |
| 9,075,710 B2* | 7/2015 | Talagala | G06F 12/0246 |
| 2001/0056409 A1 | 12/2001 | Bellovin et al. | |
| 2002/0112168 A1* | 8/2002 | Filipi-Martin | H04L 63/0428 713/183 |
| 2003/0028481 A1* | 2/2003 | Flitcroft | G07F 7/12 705/39 |
| 2004/0158534 A1 | 8/2004 | Zahir et al. | |
| 2008/0208759 A1 | 8/2008 | Royyuru | |
| 2008/0314971 A1* | 12/2008 | Faith | G06Q 20/32 235/379 |
| 2009/0276514 A1* | 11/2009 | Subramanian | G06F 21/6218 709/223 |
| 2010/0318468 A1 | 12/2010 | Carr et al. | |
| 2010/0332832 A1 | 12/2010 | Wu et al. | |
| 2011/0142234 A1 | 6/2011 | Rogers | |
| 2011/0145899 A1 | 6/2011 | Cao et al. | |
| 2011/0240745 A1 | 10/2011 | Brown | |
| 2011/0265159 A1* | 10/2011 | Ronda | H04L 9/3234 726/9 |
| 2011/0276495 A1 | 11/2011 | Varadarajan et al. | |
| 2011/0281630 A1 | 11/2011 | Omar | |
| 2011/0307381 A1 | 12/2011 | Kim et al. | |
| 2011/0307388 A1 | 12/2011 | Kim et al. | |
| 2012/0143759 A1 | 6/2012 | Ritorto, Jr. et al. | |
| 2013/0018800 A1 | 1/2013 | Devaraju | |
| 2013/0132717 A1 | 5/2013 | Brand et al. | |
| 2013/0139222 A1 | 5/2013 | Kirillin et al. | |
| 2013/0166441 A1* | 6/2013 | Kobylkin | G06Q 20/354 705/39 |
| 2013/0173915 A1 | 7/2013 | Haulund | |
| 2013/0185209 A1 | 7/2013 | Ahn | |
| 2013/0205133 A1 | 8/2013 | Hess | |
| 2013/0262317 A1* | 10/2013 | Collinge | G06Q 20/405 705/72 |
| 2013/0268439 A1 | 10/2013 | Lowe | |
| 2013/0275308 A1 | 10/2013 | Paraskeva et al. | |
| 2013/0282588 A1* | 10/2013 | Hruska | G06Q 20/10 705/67 |
| 2013/0282590 A1* | 10/2013 | Rajarethnam | G06Q 20/3276 705/71 |
| 2013/0297513 A1 | 11/2013 | Kirillin et al. | |
| 2014/0026204 A1 | 1/2014 | Buntinx | |
| 2014/0040628 A1 | 2/2014 | Fort et al. | |
| 2014/0067677 A1 | 3/2014 | Ali et al. | |
| 2014/0108263 A1 | 4/2014 | Ortiz et al. | |
| 2014/0129438 A1* | 5/2014 | Desai | G06Q 20/08 705/41 |
| 2015/0271161 A1* | 9/2015 | Katsuta | H04L 63/06 713/171 |

OTHER PUBLICATIONS

Constantinos F. Grecas, Sotirios I. Maniatis and Iakovos S. Venieris, "Introduction of the Asymmetric Cryptography in GSM, GPRS,UMTS, and Its Public Key Infrastructure Integration," Published in Mobile Networks and Applications—Security in mobile computing environments archive, vol. 8, Issue 2, Apr. 2003 (pp. 145-150).

Dandash, Osama; Yiling Wang; Phu Dung; Srinivasan, Leand Bala, "Fraudulent Internet Banking Payments Prevention using Dynamic Key," Journal of Networks . Jan. 2008, vol. 3 Issue 1, p. 25-34. 10p. 4 Diagrams, 1 Chart.

Marko Hassinen a,*, Konstantin Hypponen a, Elena Trichina, "Utilizing national public-key infrastructure in mobile payment systems," Electronic Commerce Research and Applications 7 (2008) 214-231.

Navya, V.B.; Aparna, R.; Bhaskar, G., "Mobile payment security by key shuffle mechanism in DES," Communications in Computer and Information Science, v 250 CCIS, p. 281-285, 2011.

Sood, Ridhi; Kalia, Meenakshi, "Cloudbank: A secure anonymous banking cloud," Communications in Computer and Information Science, v 94 CCIS, n PART 1, p. 295-304, 2010.

"Closed Loop Wireless Banking Payment Transaction," IP.com Prior Art Database Disclosure, IPCOM000015406D, Aug. 15, 2002.

Andrew Turk, "Customer authentication using Personal TAN (transaction number) generator in payment scenarios (online and point-of-sale) and bank transactions (ATMs, counter transactions, online transactions)," IP.com Prior Art Database Disclosure, IPCOM000018435D, Jun. 1, 2002.

Yanjiang Yang, Jianying Zhou, Jun Wen Wong, Feng Bao, "Towards Practical Anonymous Password Authentication," Proceeding ACSAC '10 Proceedings of the 26th Annual Computer Security Applications Conference, pp. 59-68, 2010.

* cited by examiner

CLOUD-BASED ELECTRONIC PAYMENT PROCESSING

CROSS-REFERENCE TO RELATED APPLICATIONS

This application claims priority from provisional U.S. Pat. App. No. 61/859,418, filed Jul. 29, 2013, which is hereby incorporated by reference in its entirety.

FIELD OF THE INVENTION

This patent application relates to a method and network for processing electronic payments at a payment terminal.

BACKGROUND

To complete a financial transaction with a merchant, the customer may interface the customer's payment card with the merchant's payment terminal. The payment terminal reads the account number from the payment card, and then generates an authorization request for the transaction amount. The authorization request is directed to the issuer of the payment card which either authorizes or declines the financial transaction.

A common problem with conventional payment card-based transactions is that the payment card may be used by an authorized party without the knowledge or approval of the cardholder. Although the cardholder can report the loss of theft of a payment card, the card issuer might authorize several financial transactions initiated with the payment card until the loss or theft is reported and acted upon by the card issuer.

SUMMARY

This patent application discloses an e-payment processing server and associated method that processes electronic payments initiated at a payment terminal from a mobile device without storing sensitive payment financial information on the mobile device.

In accordance with a first aspect of the disclosure, there is provided a method of cloud-based electronic payment processing that involves a payment processing server generating an asymmetric cryptographic key pair, generating a unique single-use payment number, providing a mobile device with a credential comprising one cryptographic key of the cryptographic key pair, and saving another cryptographic key of the cryptographic key pair in a pending transaction database in association with the single-use payment number and a financial account. The cryptographic key pair and the single-use payment number are each uniquely associated with the financial account.

The payment processing server encrypts the single-use payment number with the another cryptographic key and provides the mobile device with the encrypted single-use payment number. The encrypted single-use payment number does not identify the financial account. The payment processing server receives from a payment terminal a payment completion request requesting completion of a financial transaction. The payment completion request includes the encrypted single-use payment number decrypted with the one cryptographic key.

The payment processing server queries the pending transaction database with the decrypted single-use payment number to identify the associated financial account, and effects completion of the financial transaction using the identified financial account.

In accordance with this first aspect of the disclosure, there is also provided a payment processing server that comprises a pending transaction database, and a computer processing system in communication with the pending transaction database. The computer processing system is configured to generate an asymmetric cryptographic key pair, generate a unique single-use payment number, provide a mobile device with a credential comprising one cryptographic key of the cryptographic key pair, and save another cryptographic key of the cryptographic key pair in the pending transaction database in association with the single-use payment number and a financial account. The cryptographic key pair and the single-use payment number are each uniquely associated with the financial account.

The computer processing system is configured to encrypt the single-use payment number with the another cryptographic key, provide the mobile device with the encrypted single-use payment number, and receive from a payment terminal a payment completion request requesting completion of a financial transaction. The encrypted single-use payment number does not identify the financial account. The payment completion request includes the encrypted single-use payment number decrypted with the one cryptographic key.

The computer processing system is also configured to query the pending transaction database with the decrypted single-use payment number to identify the associated financial account, and to effect completion of the financial transaction using the identified financial account.

In accordance with a second aspect of the disclosure, there is provided a method of cloud-based electronic payment processing that involves a mobile device receiving from a payment processing server a credential comprising one cryptographic key of an asymmetric cryptographic key pair. The payment processing server is configured to save another cryptographic key of the asymmetric cryptographic key pair in a pending transaction database in association with a unique single-use payment number and a financial account. The cryptographic key pair and the single-use payment number are each uniquely associated with the financial account.

The mobile device receives from the payment processing server the single-use payment number encrypted with the another cryptographic key, decrypts the encrypted single-use payment number with the one cryptographic key, and initiates completion of a financial transaction by providing a payment terminal with the decrypted single-use payment number. The encrypted single-use payment number does not identify the financial account.

The payment terminal is configured to provide the payment processing server with a payment completion request requesting completion of the financial transaction. The payment completion request includes the decrypted single-use payment number. The payment processing server is configured to query the pending transaction database with the decrypted single-use payment number to identify the associated financial account and to effect completion of the financial transaction using the identified financial account.

In accordance with this second aspect of the disclosure, there is also provided a mobile device that comprises a memory and a computer processing system in communication with the memory. The computer processing system is configured to receive from a payment processing server a credential comprising one cryptographic key of an asymmetric cryptographic key pair. The payment processing server is configured to save another cryptographic key of the asymmetric cryptographic key pair in a pending transaction database in association with a unique single-use payment number and a financial account. The single-use payment number does not identify the financial account. The cryptographic key pair and the single-use payment number are each uniquely associated with the financial account.

The payment processing server is configured to save the one cryptographic key in the memory, receive from the payment processing server the single-use payment number encrypted with the another cryptographic key, decrypt the encrypted single-use payment number with the one cryptographic key, and initiate completion of a financial transaction by providing a payment terminal with the decrypted single-use payment number. The encrypted single-use payment number does not identify the financial account.

The payment terminal is configured to provide the payment processing server with a payment completion request requesting completion of the financial transaction. The payment completion request includes the decrypted single-use payment number. The payment processing server is configured to query the pending transaction database with the decrypted single-use payment number to identify the associated financial account and to effect completion of the financial transaction using the identified financial account.

Since the asymmetric cryptographic key pair is unique, and the cryptographic key saved by the payment processing server is uniquely associated with the single-use payment number, only the cryptographic key provided to the mobile device can be used to decrypt the encrypted single-use payment number. Moreover, the encrypted payment number does not include the account number of the financial account. Accordingly, unauthorized use of the encrypted single-use payment number is of limited value.

BRIEF DESCRIPTION OF THE DRAWINGS

An exemplary cloud-based e-payment processing network, payment processing server, and method of cloud-based e-payment processing will now be described, with reference to the accompanying drawings, in which.

DETAILED DESCRIPTION e-Payment Processing Network

Figure 1:
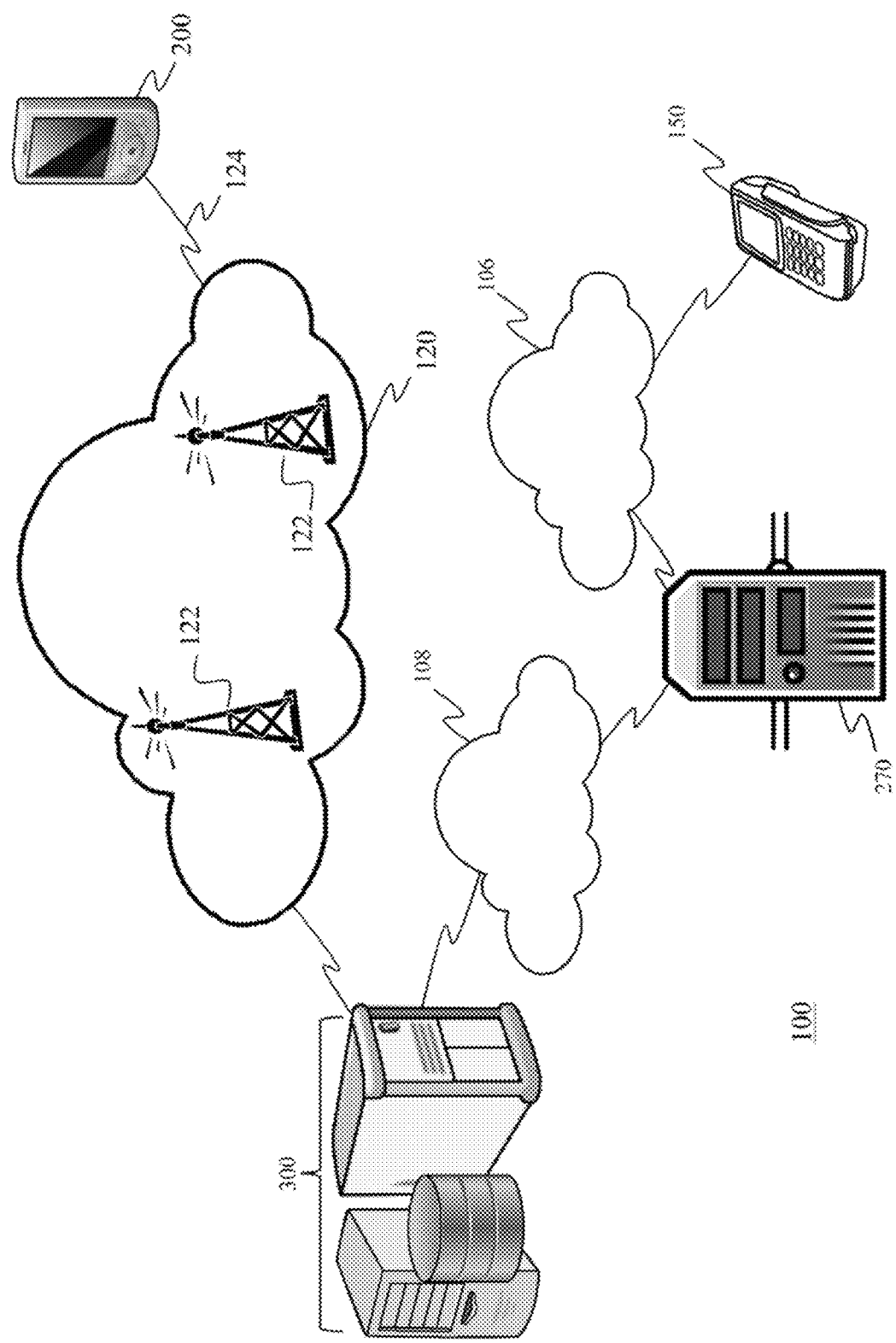
FIG. 1 is a schematic view of the cloud-based e-payment processing network, depicting a payment processing server, a payment terminal, and a plurality of mobile devices.

FIG. 1 is a schematic view of cloud-based e-payment processing network, denoted generally as 100. As shown, the e-payment processing network 100 comprises a payment terminal 150, a mobile device 200, an acquirer server 270 and an e-payment processing server 300. Although the e-payment processing network 100 is shown comprising only a single payment terminal 150, a single mobile device 200, and only a single e-payment processing server 300, the e-payment processing network 100 typically includes a plurality of the payment terminals 150, a plurality of the mobile devices 200, a plurality of the acquirer servers 270, and a plurality of the e-payment processing servers 300.

The payment terminals 150 are typically deployed at a merchant's business premises, and are configured to communicate with one of the acquirer servers 270 via a secure acquirer network 106. As non-limiting examples, one or more of the payment terminals 150 may be implemented as an integrated point-of-sale (POS) terminal, a pin-pad terminal that communicates with respective electronic cash register (ECR), an automated teller machine (ATM), or an automated banking machine (ABM). Preferably the payment terminals 150 are also configured to allow the payment terminals 150 to wirelessly communicate with nodes that are in close proximity to the payment terminals 150 using short-range communications protocols, such as Bluetooth and/or Near Field Communications (NFC) as examples.

One or more of the mobile devices 200 may be implemented as a wireless communications device configured to operate within a wireless network. Accordingly, preferably the e-payment processing network 100 includes a mobile communications network 120. The mobile communications network 120 may be configured as a WiFi network, a cellular network, or a combination thereof. As shown, the mobile communications network 120 comprises a plurality of wireless base station subsystems 122. The mobile devices 200 communicate with the base station subsystems 122 via wireless links 124, and the base station subsystems 122 communicate with the e-payment processing server(s) 300 via a wired, wireless or optical link. Accordingly, the base station subsystems 122 act as a bridge between the mobile devices 200 and the e-payment processing server(s) 300.

Each acquirer server 270 is associated with a respective merchant, and is configured to communicate with the payment terminals 150 that are deployed at each merchant via each merchant's acquirer network 106. The acquirer servers 270 are also configured to communicate with the e-payment processing server(s) 300 via a payment network 108, such as VisaNet®, the Mastercard® Network or the Interac® Network, that is distinct from the mobile communications network 120.

Each payment processing server 300 may be associated with and administered by a respective financial institution. The financial institution associated with the e-payment processing server 300 issues payment cards (e.g. credit card, debit card) to cardholders. Each e-payment processing server 300 may maintain one or more financial accounts each associated with a respective cardholder, and is configured to communicate with the mobile devices 200 via the mobile communications network 120. Each e-payment processing server 300 is also configured to communicate with the acquirer servers 270 via the payment network 108.

Mobile Device

Figure 2:
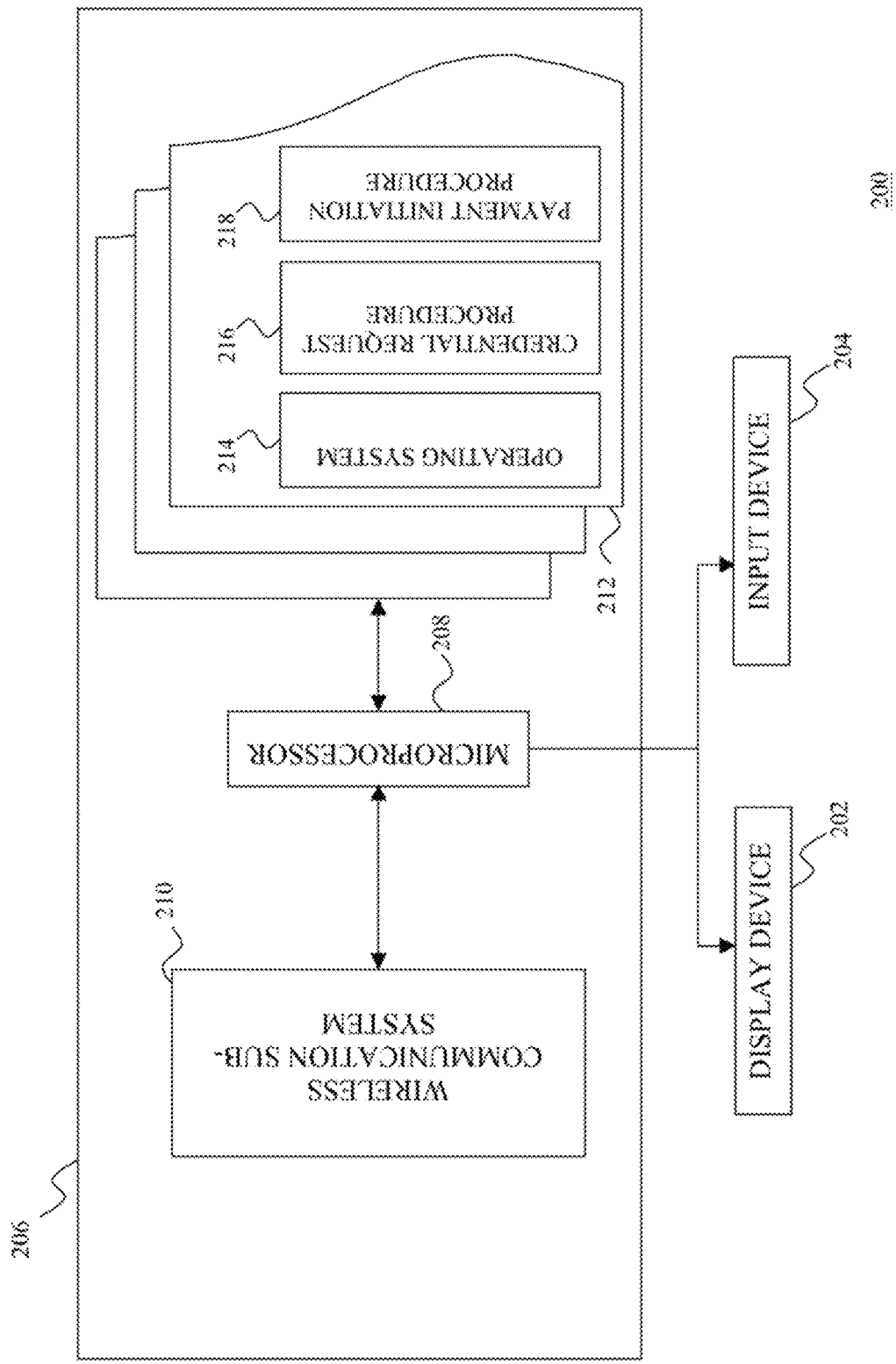
FIG. 2 is a schematic view of one of the mobile devices.

A sample mobile device 200, implemented as a wireless communications device, is depicted in FIG. 2. As shown, the mobile device 200 includes a display 202, user input device 204, and a computer processing system 206. The user input device 204 may be provided as a keyboard, biometric input device (e.g. microphone) and/or a touch-sensitive layer provided on the display 202. The computer processing system 206 comprises a microprocessor 208, a wireless communication sub-system 210 and a memory 212.

The communication sub-system 210 allows the mobile device 200 to communicate with the mobile communications network 120. As discussed, the mobile communications network 120 may be configured as a WiFi network, a cellular network, or a combination thereof. Accordingly, the communication sub-system 210 allows the mobile device 200 to transmit and receive wireless communications signals over WiFi networks and/or cellular networks. Preferably the communication sub-system 210 is also configured to allow the mobile device 200 to wirelessly communicate with nodes that are in close proximity to the mobile device 100, such as the payment terminal(s) 150, using short-range communications protocols, such as Bluetooth and/or NFC as examples.

The memory 212 typically comprises non-removable non-transient non-volatile memory of the mobile device 100, and includes computer processing instructions stored thereon which, when accessed from the memory 212 and executed by the microprocessor 208, implement an operating system 214, a credential request procedure 216 and a payment initiation procedure 218. The operating system 214 is configured to display output on the display 202, to receive user input from the input device 204, to send and receive communication signals over the wireless link 124 of the mobile communications network 120, and to send and receive short-range communication signals to/from proximate nodes of the e-payment processing network 100.

The operation of the credential request procedure 216 and the payment initiation procedure 218 will be discussed in greater detail below. However, it is sufficient at this point to note that the credential request procedure 216 is configured to receive from the e-payment processing server 300, via the mobile communications network 120, a credential that is uniquely associated with a unique single-use payment number and a financial account in a pending transaction database of the e-payment processing server 300.

The payment initiation procedure 218 is configured to receive from the e-payment processing server 300, via the mobile communications network 120, an encrypted version of the single-use payment number. The encrypted single-use payment number does not include the account number of the associated financial account. The payment initiation procedure 218 is also configured to decrypt the encrypted single-use payment number with the credential, and to initiate completion of a financial transaction by providing a payment terminal 150 with the decrypted single-use payment number (for example via Bluetooth or NFC).

Although the credential request procedure 216 and the payment initiation procedure 218 are typically implemented as computer processing instructions, all or a portion of the functionality of the credential request procedure 216 and/or the payment initiation procedure 218 may be implemented instead in electronics hardware.

e-Payment Processing Server

Figure 3:
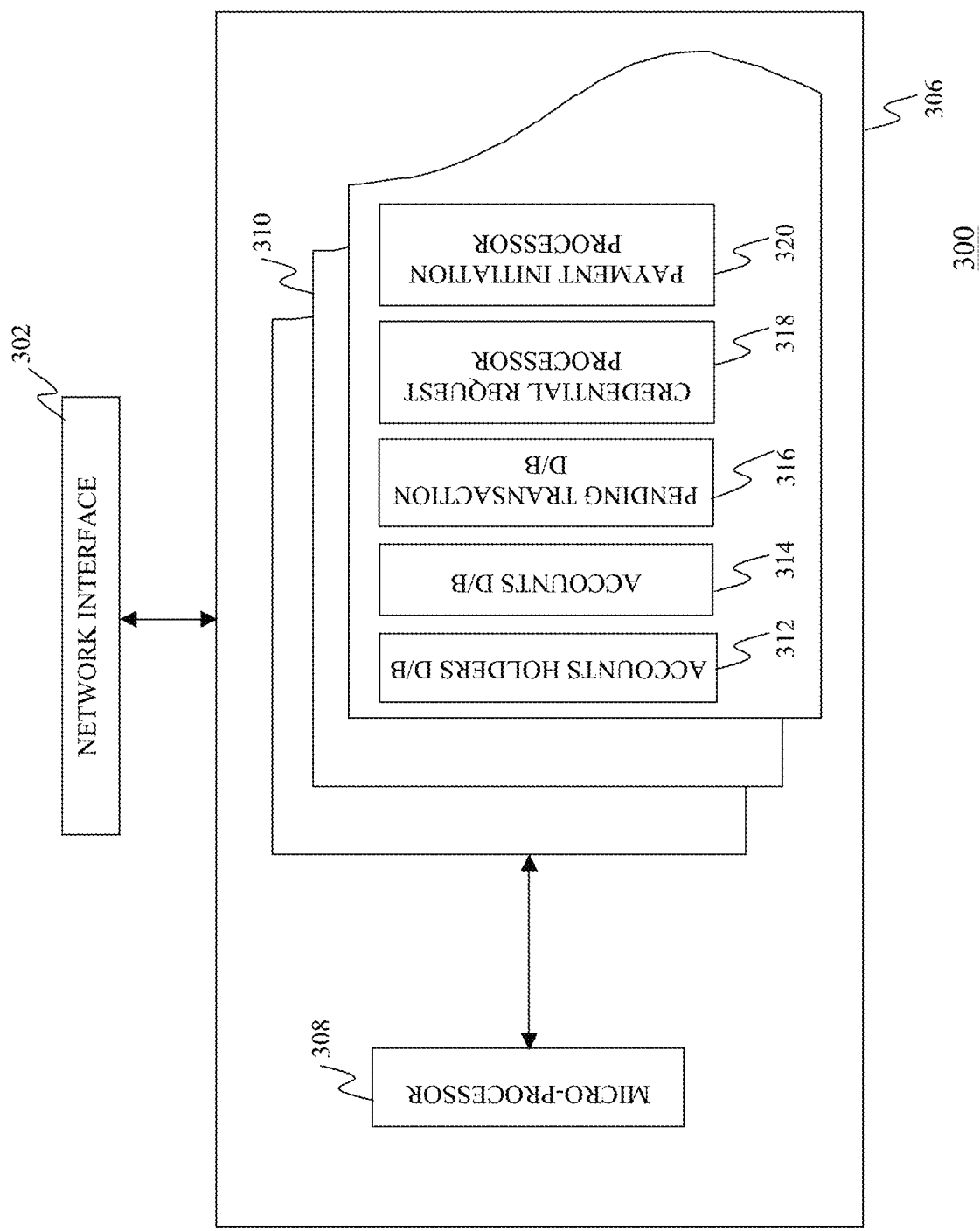
FIG. 3 is a schematic view of the payment processing server.

A sample e-payment processing server 300 is depicted in FIG. 3. As shown, the e-payment processing server 300 includes a network interface 302, and a computer processing system 306 that is coupled to the network interface 302. The network interface 302 interfaces the e-payment processing server 300 with the base station subsystems 122 of the mobile communications network 120 to thereby allow the e-payment processing server 300 to communicate with the mobile devices 200. The network interface 302 also interfaces the e-payment processing server 300 with the payment network 108 to thereby allow the e-payment processing server 300 to communicate with the acquirer servers 270. If the e-payment processing server 300 acts as a trusted intermediary to financial institution account servers, the network interface 302 also allows the e-payment processing server 300 to communicate with the account servers via the payment network 108.

The computer processing system 306 may include one or more microprocessors 308 and a non-transient computer-readable medium 310. The non-transient computer-readable medium 310 may be provided as electronic computer memory (e.g. flash memory) or optical or magnetic memory (e.g. compact disc, hard disk).

The computer-readable medium 310 may maintain an account holders database 312 and an accounts database 314. The account holders database 312 also includes a plurality of clusters each associated with a respective cardholder. Preferably, each cluster of the account holders database 312 includes credentials (e.g. username, password, personal identification number (PIN)) that are uniquely associated with the respective cardholder. The accounts database 314 includes a plurality of clusters each associated with a respective financial account and cardholder. Each cluster of the accounts database 314 typically comprises a plurality of database records, each identifying a credit/deposit entry to the associated financial account. Alternately, instead of the e-payment processing server 300 maintaining the account holders database 312 and the accounts database 314, in one variation account servers (e.g. financial institution servers) maintain an account holders database 312 for the cardholders associated with the respective financial institution, and an accounts database 314 each identifying credit/deposit entries to the associated financial accounts, and the financial instrument processing server 300 acts as a trusted intermediary to the account servers.

The computer-readable medium 310 may also maintain a pending transaction database 316. The pending transaction database 316 includes a plurality of clusters each associated with a respective financial transaction that is pending with the e-payment processing network 100. Preferably, each cluster of the pending transaction database 316 identifies a single-use payment number, the account number of one of the financial accounts, and a credential that is uniquely associated with the single-use payment number and the financial account.

The computer-readable medium 310 also maintains computer processing instructions stored thereon which, when executed by the microprocessor(s) 308, define an operating system (not shown) that controls the overall operation of the e-payment processing server 300. The computer processing instructions also implement a credential request processor 318 and a payment initiation processor 320.

The credential request processor 318 is configured to generate an asymmetric cryptographic key pair, provide a mobile device 200 with a credential comprising one cryptographic key of the cryptographic key pair, generate a unique single-use payment number, and save the other cryptographic key of the cryptographic key pair in the pending transaction database 316 in association with the single-use payment number and the financial account. The cryptographic key pair and the single-use payment number are each uniquely associated with the financial account. The credential request processor 318 is also configured to encrypt the single-use payment number with the other cryptographic key, and provide the mobile device 200 with the encrypted single-use payment number. The encrypted single-use payment number does not include the account number of the associated financial account.

The payment initiation processor 320 is configured to receive from a payment terminal 150 a payment authorization request that requests authorization for a financial transaction. The payment authorization request includes the encrypted single-use payment number, but decrypted with the cryptographic key that was provided to the mobile device 200. The payment initiation processor 320 is also configured query the pending transaction database 316 with the decrypted single-use payment number to identify the associated financial account, and to effect completion of the financial transaction using the identified financial account.

Although the credential request processor 318 and the payment initiation processor 320 are typically implemented as computer processing instructions, all or a portion of the functionality of the credential request processor 318 and/or the payment initiation processor 320 may be implemented instead in electronics hardware.

Method of e-Payment Processing

As discussed, the e-payment processing network 100 implements a method of cloud-based e-payment processing. A sample embodiment of the e-payment method will be discussed with reference to FIG. 4. As will be explained, in this embodiment the payment processing server 300 generates an asymmetric cryptographic key pair, provides the mobile device 200 with a credential comprising one cryptographic key of the cryptographic key pair, generates a unique single-use payment number, and saves the other cryptographic key of the cryptographic key pair in the pending transaction database 316 in association with the single-use payment number and a financial account. The cryptographic key pair and the single-use payment number are each uniquely associated with the financial account.

The payment processing server 300 encrypts the single-use payment number with the other cryptographic key, and provides the mobile device 200 with the encrypted single-use payment number. The encrypted single-use payment number does not include the account number of the associated financial account.

The mobile device 200 decrypts the encrypted single-use payment number with the cryptographic key provided by the payment processing server 300, and initiates completion of a financial transaction by providing a payment terminal 150 with the decrypted single-use payment number.

The payment processing server 300 receives from the payment terminal 150 a payment authorization request that requests authorization for the financial transaction. The payment authorization request includes the encrypted single-use payment number decrypted by the cryptographic key that was provided to the mobile device 200. The payment processing server 300 queries the pending transaction database 316 with the decrypted single-use payment number to identify the associated financial account, and effects completion of the financial transaction using the identified financial account.

Figure 4:
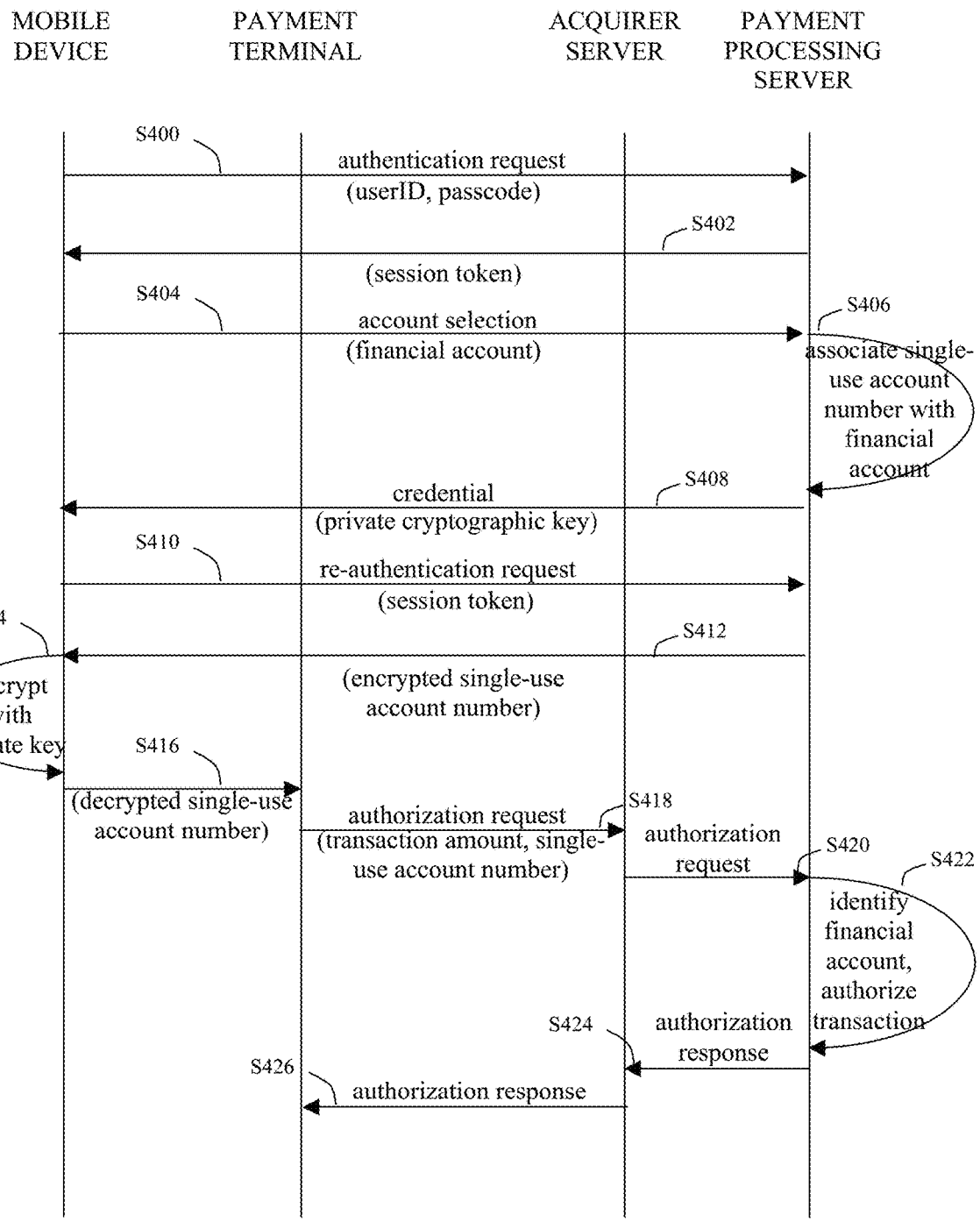
FIG. 4 is a message flow diagram depicting the method of cloud-based e-payment processing.

An example e-payment method will now be discussed in detail with reference to FIG. 4. The user of the mobile device 200 initiates a credential allocation process by invoking the credential request procedure 216 on the mobile device 200. In response, the mobile device 200 communicates with the payment processing server 300 via the mobile communications network 120, and attempts to authenticate the device user to the payment processing server 300, at step S400. Typically, the device user authenticates by providing the payment processing server 300 with the authentication credentials (e.g. userID, passcode) that the device user normally uses to initiate online banking with the payment processing server 300. The payment processing server 300 authenticates the device user by validating the provided authentication credentials against the credentials associated with the device user in the account holders database 312.

After the device user successfully authenticates to the payment processing server 300, the credential request processor 318 of the payment processing server 300 establishes an encrypted communications channel with the mobile device 200 via the mobile communications network 120, provides the mobile device 200 with a unique session token at step S402, and prompts the device user to select the financial account (e.g. credit card account, bank account) that the device user would like to use in the e-payment transaction (i.e. the account to which the device user would like the e-payment to be applied). The device user provides the payment processing server 300 with the financial account selection, at step S404.

After the device user successfully authenticates to the payment processing server 300, the credential request processor 318 also generates a unique asymmetric cryptographic key pair. The credential request processor 318 may generate the cryptographic key pair using the output of a pseudo-random number generator as an input to a cryptographic key generation algorithm, and may verify that the cryptographic key pair is uniquely associated with the device user by confirming that neither cryptographic key of the cryptographic key pair is currently stored in the pending transaction database 316.

The credential request processor 318 also generates a unique single-use account number. The credential request processor 318 may generate the single-use account number from the output of a pseudo-random number generator. To ensure that the single-use account number is uniquely associated with the payment processing server 300, the credential request processor 318 prefixes the pseudo-random number with the Bank Identification Number (BIN) that is assigned to the financial institution that is associated with the payment processing server 300.

The credential request processor 318 may also verify that the resulting single-use account number is uniquely associated with the device user by confirming that the single-use account number is not currently stored in the pending transaction database 316. Preferably, the payment processing server 300 also confirms that the single-use account number does not include the account number of the financial account selected by the device user. The payment processing server 300 may also verify that the single-use account number, when encrypted with any of the cryptographic keys of the asymmetric cryptographic key pair, does not yield the account number of the financial account selected by the device user. Alternately, the cryptographic algorithms (and/or the seed values thereto) used by the payment processing server 300 may ensure these results.

After the payment processing server 300 has received the financial account selection and has generated the unique asymmetric cryptographic key pair and the unique single-use account number, at step S406 the payment processing server 300 saves the single-use account number and one cryptographic key of the asymmetric cryptographic key pair in the pending transaction database 316, in association with the account number of the financial account selected by the device user. As discussed above, the single-use account number, when encrypted with the cryptographic key saved in the pending transaction database 316, does not yield the account number of the financial account.

The payment processing server 300 may also generate a time stamp when it generates the single-use account number, and associate the time stamp with the single-use account number in the pending transaction database 316. As will be discussed, the time stamp allows the payment processing server 300 to assign a maximum lifetime period to the association that was established between the single-use account number and the financial account, after which the association and the single-use account number will be considered to have expired. The single-use account number is globally unique in the sense that, during the lifetime of the single-use account number, the financial account identified by the device user at step S404 is only associated with this particular single-use account number.

The payment processing server 300 transmits a credential to the mobile device 200 over the encrypted communications channel, at step S408. The credential is globally unique in the sense that, during the lifetime of the single-use account number, the financial account identified by the device user at step S404 is only associated with this particular credential. The credential may be the other cryptographic key of the asymmetric cryptographic key pair (i.e. the key corresponding to the cryptographic key that was stored in the pending transaction database 316). However, preferably the credential comprises a X.509 digital certificate that includes the other cryptographic key. Therefore, in this variation, the cryptographic key saved in the pending transaction database 316 comprises a public cryptographic key, and the other cryptographic key (included in the X.509 certificate) comprises a private cryptographic key.

The credential request procedure 216 saves the credential in the memory 212, and may confirm to the device user that the credential has been saved in the memory 212, thereby completing the credential allocation process. The credential request procedure 216 may then invoke the payment initiation procedure 218. Alternately, the device user may manually invoke the invoke payment initiation procedure 218.

As is well-known in the state of the art, to allow a customer to complete a conventional financial transaction with a merchant, the merchant inputs the transaction particulars, including the transaction amount, into one of the merchant's payment terminals 150 and asks the customer for the customer's payment card. However, in the current embodiment, instead of the device user immediately presenting the merchant with a physical payment card, the payment initiation procedure 218 may prompt the device user to move the mobile device 200 into close proximity with the merchant's payment terminal 200.

The payment initiation procedure 218 uses a short-range communications protocol, such as Bluetooth or NFC, to establish a communications session with the payment terminal 150. Upon establishing a communications session with the payment terminal 150, the payment terminal 150 requests a payment card number from the mobile device 200.

The payment initiation procedure 218 may then re-authenticate the device user to the payment processing server 300, at step S410, for example by providing the payment processing server 300 with the session token that was provided to the mobile device 200 at step S402. The payment initiation processor 320 of the payment processing server 300 establishes a new encrypted communications channel with the mobile device 200 via the mobile communications network 120, encrypts the single-use account number with the cryptographic key that was associated with the mobile device's credential, and transmits the encrypted single-use account number to the mobile device 200 over the new encrypted communications channel, at step S412. The encrypted single-use account number does not include the account number of the associated financial account. The payment initiation procedure 218 saves the encrypted single-use account number in the memory 212.

As discussed, the payment processing server 300 may generate a time stamp when it generates the single-use account number, and associate the time stamp with the single-use account number in the pending transaction database 316. Alternately, the payment initiation processor 320 may generate the time stamp when it transmits the encrypted single-use account number to the mobile device 200 at step S412.

After the mobile device 200 receives the encrypted single-use account number, at step S414 the payment initiation procedure 218 decrypts the encrypted single-use account number with the credential (private cryptographic key) that was transmitted to the mobile device 200 at step S408. Since the payment processing server 300 transmits the encrypted single-use account number and the credential to the mobile device 200 over different communications channels, the likelihood of an authorized party being able to recover the single-use account number from the encrypted single-use account number is limited.

Where the financial account selected by the device user at step S404 is a credit card account, the payment initiation procedure 218 may transmit the decrypted single-use account number to the payment terminal 150, at step S416, via the previously-established communications session. Alternately, where the financial account selected by the device user at step S404 is a bank account, the payment initiation procedure 218 may prompt the device user to input the user's PIN into the mobile device 200, and then transmit the decrypted single-use account number and the user's PIN to the payment terminal 150, at step S416, via the previously-established communications session.

Preferably, the payment initiation procedure 218 transmits the decrypted single-use account number (and user's PIN, if provided) to the payment terminal 150 as conventional Track 2 data. After receiving confirmation that the payment terminal 150 has successfully received the decrypted single-use account number from the mobile device 150, the payment initiation procedure 218 may delete the credential and the encrypted single-use account number from the memory 212.

The payment terminal 150 generates a payment authorization request, and transmits the payment authorization request to the merchant's acquirer server 270 via the acquirer network 106, at step S418. The payment authorization request includes the transaction amount, the decrypted single-use account number and the user's PIN (if provided). The acquirer server 270 delivers the payment authorization request to the payment network 108. As discussed, the single-use account number is prefixed with the BIN that is assigned to the financial institution of the payment processing server 300. Accordingly, the payment network 108 uses the BIN to direct the payment authorization request to the appropriate payment processing server 300 at step S420.

The payment initiation processor 320 of the payment processing server 300 extracts the single-use account number from the payment authorization request, and queries the pending transaction database 316 with the extracted single-use account number, at step S422, for the associated time stamp and the account number of the associated financial account. The payment initiation processor 320 uses the time stamp to determine whether the maximum lifetime period of the single-use account number (and the association between the single-use account number and the financial account) has expired. Preferably, the payment processing server 300 assigns a short-term maximum lifetime period to all single-use account numbers to make the single-use payment numbers of limited value to unauthorized parties.

If the payment initiation processor 320 determines that the single-use account number (and the single-use account number and financial account association) has expired, the payment initiation processor 320 may delete the single-use account number and associated cryptographic key from the pending transaction database 316. The payment processing server 300 may also periodically purge expired single-use account numbers and associated cryptographic keys from the pending transaction database 316.

If the payment initiation processor 320 determines that the single-use account number (and the single-use account number and financial account association) has not expired, the payment processing server 300 may query the accounts database 314 with the transaction amount and with the account number of the associated financial account to determine whether the device user (customer) has sufficient credit available (i.e. a credit balance at least equal to the transaction amount) to complete the financial transaction.

If the financial account is a credit card account, the payment initiation processor 320 generates a payment authorization response that indicates whether the payment processing server 300 authorized the financial transaction. Alternately, if the financial instrument processing server 300 acts as a trusted intermediary to one or more account servers, the payment processing server 300 forwards the account number and transaction amount to the respective account server for authorization by the financial institution of the device user (customer). The payment processing server 300 then generates a payment authorization response indicating whether the user's financial institution authorized the financial transaction for the transaction amount.

The payment initiation processor 320 then deletes the single-use account number and associated cryptographic key from the pending transaction database 316, and responds to the payment network 108 with the payment authorization response in response to the payment authorization request. The payment network 108 directs the payment authorization response to the merchant's acquirer server 270 at step S424. The acquirer server 270 transmits the payment authorization response to the payment terminal 150, via the acquirer network 106, at step S426. The merchant thereafter uses the payment authorization response in a settlement process to have the transaction amount deposited to a financial account of the merchant.

If the financial account is a bank account, the payment processing server 300 validates the PIN that was included in the payment authorization request against the PIN that is associated with the device user in the account holders database 312. If the user's PIN is validated, the payment processing server 300 debits the financial account in the transaction amount, and generates a payment authorization response that indicates whether the financial transaction was successfully completed at the payment processing server 300. Alternately, if the payment processing server 300 acts as a trusted intermediary to one or more account servers, the payment processing server 300 forwards the account number, the user's PIN and the transaction amount to the respective account server for processing by the financial institution of the device user (customer). The payment processing server 300 then generates a payment authorization response that indicates whether the financial transaction was successfully completed at the user's financial institution.

The payment initiation processor 320 then deletes the single-use account number and associated cryptographic key from the pending transaction database 316, and responds to the payment network 108 with the payment authorization response in response to the payment authorization request. The payment network 108 directs the payment authorization response to the merchant's acquirer server 270 at step S424. The acquirer server 270 credits the merchant's financial account with the transaction amount, and transmits the payment authorization response to the payment terminal 150, via the acquirer network 106, at step S426.

As will be apparent, the encrypted single-use payment number can only be decrypted using the credential (private cryptographic key) that was provided to the mobile device 200 at step S408. Since the encrypted single-use payment number does not include the account number of the associated financial account, and the single-use payment number preferably has a short-term maximum lifetime period, unauthorized use of the single-use payment number is of limited value.

The invention claimed is:

1. A method of cloud-based electronic payment processing, the method comprising:
   a payment processing server generating an asymmetric cryptographic key pair, over one secure communications channel providing a mobile device with a credential comprising one cryptographic key of the cryptographic key pair, generating a unique single-use payment number, uniquely associating the cryptographic key pair and the single-use payment number with a financial account by saving another cryptographic key of the cryptographic key pair in a pending transaction database uniquely in association with the single-use payment number and the financial account;
   the payment processing server encrypting the single-use payment number with the another cryptographic key;
   the mobile device (i) receiving from a payment terminal a card number request requesting a card number from the mobile device, (ii) establishing with the payment processing server another secure communications channel distinct from the one secure communications channel, (iii) receiving the encrypted single-use payment number from the payment processing server over the another secure communications channel, (iv) generating a decrypted single-use payment number by decrypting the encrypted single-use payment number with the one cryptographic key, and (v) transmitting the decrypted single-use payment number to the payment terminal in response to the card number request;
   the payment processing server receiving from the payment terminal a payment completion request requesting completion of a financial transaction, the payment completion request including the decrypted single-use payment number and a transaction amount;
   the payment processing server identifying the financial account associated with the decrypted single-use payment number by querying the pending transaction database with the decrypted single-use payment number, and
   the payment processing server initiating completion of the financial transaction by one of transferring funds from, and obtaining authorization for a charge to, the identified financial account in an amount equal to the transaction amount.

2. The method according to claim 1, wherein the single-use payment number has a life-time period, and the effecting completion of the financial transaction comprises the payment processing server confirming non-expiry of the life time period and effecting the completion of the financial transaction after confirming the non-expiry of the life-time period.

3. The method according to claim 1, wherein the effecting completion of the financial transaction comprises the payment processing server purging the asymmetric cryptographic key pair and the association from the pending transaction database after the identifying the financial account associated with the decrypted single-use payment number.

4. The method according to claim 1, wherein the one cryptographic key comprises a public cryptographic key, and the another cryptographic key comprise a private cryptographic key.

5. A payment processing server comprising:
a computer processing system comprising a pending transaction database and configured to:
(i) generate an asymmetric cryptographic key pair, generate a unique single-use payment number, over one secure communications channel provide a mobile device with a credential comprising one cryptographic key of the cryptographic key pair, and uniquely associate the cryptographic key pair and the single-use payment number with a financial account by saving another cryptographic key of the cryptographic key pair in the pending transaction database uniquely in association with the single-use payment number and the financial account;
(ii) establish with the mobile device another secure communications channel distinct from the one secure communications channel, encrypt the unique single-use payment number with the another cryptographic key, and transmit the encrypted single-use payment number to the mobile device over the another secure communications channel, the computer processing system being configured to encrypt the single-use payment number by confirming that the encrypted single-use payment number does not identify the financial account;
(iii) receive from a payment terminal a payment completion request requesting completion of a financial transaction, the payment completion request including the unique single-use payment number and a transaction amount;
(iv) identify the financial account associated with the received unique single-use payment number by querying the pending transaction database with the received unique single-use payment number, and
(v) initiate completion of the financial transaction by one of transferring funds from, and obtaining authorization for a charge to, the identified financial account in an amount equal to the transaction amount.

6. The payment processing server according to claim 5, wherein the single-use payment number has a life-time period, and the computer processing system is configured to confirm non-expiry of the life time period, and to effect the completion of the financial transaction after confirming the non-expiry of the life-time period.

7. The payment processing server according to claim 5, wherein the computer processing system is configured to effect the completion of the financial transaction by purging the asymmetric cryptographic key pair and the association from the pending transaction database after the identifying the financial account associated with the decrypted single-use payment number.

8. The payment processing server according to claim 5, wherein the one cryptographic key comprises a public cryptographic key, and the another cryptographic key comprise a private cryptographic key.

9. A non-transient computer-readable medium carrying computer processing instructions stored thereon which, when executed by a computer, cause the computer to perform a sequence comprising:
generating an asymmetric cryptographic key pair, over one secure communications channel providing a mobile device with a credential comprising one cryptographic key of the cryptographic key pair, generating a unique single-use payment number, and uniquely associating the cryptographic key pair and the single-use payment number with a financial account by saving another cryptographic key of the cryptographic key pair in a pending transaction database uniquely in association with the single-use payment number and the financial account, the cryptographic key pair and the single-use payment number each being uniquely associated with the financial account;
establishing with the mobile device another secure communications channel distinct from the one secure communications channel, encrypting the unique single-use payment number with the another cryptographic key, and transmitting the encrypted single-use payment number to the mobile device over the another secure communications channel, the encrypting the single-use payment number comprising confirming that the encrypted single-use payment number does not identify the financial account;
receiving from a payment terminal a payment completion request requesting completion of a financial transaction, the payment completion request including the unique single-use payment number and a transaction amount;
identifying the financial account associated with the received unique single-use payment number by querying the pending transaction database with the received unique single-use payment number, and
initiating completion of the financial transaction by one of transferring funds from, and obtaining authorization for a charge to, the identified financial account in an amount equal to the transaction amount.

\* \* \* \* \*